June 10, 1941.  W. R. APPLEMAN  2,244,757
ELECTRIC MOTOR
Filed June 9, 1939
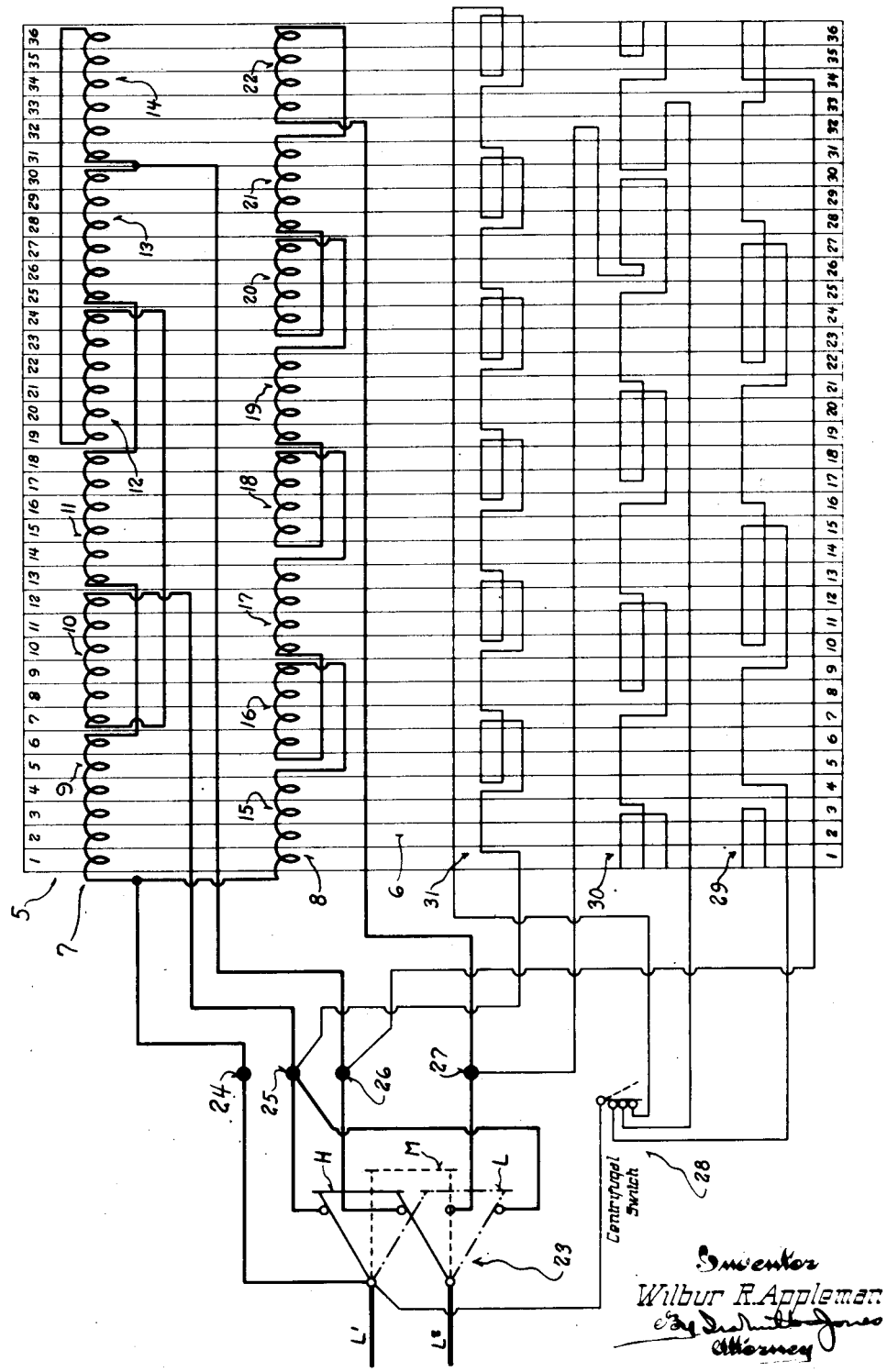

Patented June 10, 1941

2,244,757

UNITED STATES PATENT OFFICE 2,244,757

ELECTRIC MOTOR

Wilbur R. Appleman, Wausau, Wis., assignor to Marathon Electric Manufacturing Corporation, Wausau, Wis., a corporation of Wisconsin Application June 9, 1939, Serial No. 278,177

6 Claims. (Cl. 172—279)

This invention relates to electric motors, and has as a general object to provide a practical three speed split phase motor.

Heretofore, split phase motors were never made with more than two operating speeds; and in other motors, such as capacitor motors, shaded pole motors, choke coil motors, and the like, when a third speed was desired, the use of slip was resorted to. This manner of obtaining a third speed, however, is objectionable as any slight variation in voltage or load seriously affects the speed constancy. In other words, a speed attained through the use of slip is not definite.

It is therefore the purpose of this invention to provide an electric motor which is so designed that three definite and distinct operating speeds are made possible entirely without the use of slip, and moreover, to provide a split phase motor with three operating speeds.

As defined at length in the copending application of Wilbur R. Appleman, Serial No. 247,864, filed December 27, 1938, the operating speed of a split phase motor may be altered by changing the number of its stator poles. As the number of poles is reduced, the speed of the motor is increased. The present invention utilizes this fact through the provision of means for changing the number of effective poles in the main winding to give the motor the desired speed characteristics.

It is thus a further object of the invention to provide an electric motor wherein three specific and definite operating speeds are attained by so connecting its main windings that the number of effective poles may be altered by actuation of a speed selector switch.

Another object of this invention is to provide an electric motor of the character described which has a separate starting winding for each of the three operating speeds, arranged to be connected in circuit concomitantly with the selection of the speed.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which the single figure is a diagrammatic representation of the stator of an electric motor constructed in accordance with this invention.

Referring now particularly to the accompanying drawing in which like numerals indicate like parts, the numeral 5 represents the stator laminations of a split phase motor, which, in this case, has thirty-six slots, designated 6, and numbered across the top and bottom for convenience.

Mounted on the stator laminations are two main windings 7 and 8, which may consist of concentric coils or be wound as a progressive winding. The coils of the winding 7 are arranged in six groups 9, 10, 11, 12, 13, and 14. This winding, as will be hereinafter pointed out, gives the motor stator either six or twelve poles.

The winding 8 has its coils arranged in eight groups 15, 16, 17, 18, 19, 20, 21, and 22 to provide eight poles for the stator.

Both of the main windings are connectible across supply lines $L^1$, $L^2$, through a three position speed selector switch, designated generally by the numeral 23. The speed selector switch has a high speed position, a medium speed position, and a low speed position, indicated, respectively, by the characters H, M, and L.

In its high speed position, shown in full lines, the winding 7 is so connected across the lines that it gives the stator six poles, which in the present instance, is the minimum number of poles employed. For this purpose, the terminal 24 at one end of the winding 7 is connected direct with line $L^1$ and the terminal 25, which leads to the group of coils 10 of the winding 7, is connected with line $L^1$ through the switch. The other side of the line $L^2$ is connected through the switch with terminal 26, which in turn, is connected with the main winding 7 between its groups of coils 13 and 14.

As will be clear from the diagram, with the main winding connected to the lines in this manner, current flows in opposite directions in adjacent groups of coils so that the stator has six poles.

Actuation of the speed selector switch 23 to its low speed position L, illustrated in dotted lines, connects the winding 7 with the lines in such a manner that current traverses the adjacent groups of coils in the same direction to thereby induce consequent poles therebetween, which raises the total number of poles to twelve and gives the desired low speed operation.

With the switch 23 in its low speed position L, the line $L^1$ remains connected with the terminal 24, but the line $L^2$ is connected with the terminal 25, the terminal 26 having no connection with the lines.

The circuit whereby current traverses adjacent groups of coils of the winding 7 in the same direction with this connection can be readily traced on the diagram.

Medium speed is attained through the use of the main winding 8, which is connected across the lines L¹, L², when the switch 23 is in its medium position M. In this position of the switch, the line L¹ is connected with the terminal 24, which is also connected with one side of the winding 8, and line L² is connected with a terminal 27, which is connected with the opposite end of the winding 8.

The connections of the groups of coils in the winding 8 is such that current traverses adjacent groups in opposite directions, as can be clearly seen on the diagram, and, as a result, the stator has eight poles to give the motor an intermediate speed.

As noted hereinbefore, a separate starting winding is provided for each of the three operating speeds. A single centrifugal switch 28 controls their connection across the lines. The live terminal of this switch is connected with line L¹, and the other terminals thereof each have one side of one starting winding connected thereto. The opposite sides of the starting windings are selectively connected with line L² through the switch 23.

The high speed starting winding, designated 29, has its coils properly coordinated and positioned with respect to the groups of coils of the main winding 7 and is connected across the lines when the switch 23 is in its high speed position, one side thereof being connected with the line L¹ through the centrifugal switch, and the other side thereof being connected to a terminal 26 so as to connect with line L² in this position of the switch 23.

For the intermediate speed, a starting winding 30 having its coils properly coordinated and positioned with relation to the winding 8 is connected across the lines L¹, L², one side thereof being connected with line L¹ through the centrifugal switch, and the other side being connected to terminal 27 for connection with line L².

The low speed starting winding, designated 31, has its side which is not connected to the centrifugal switch connected to the terminal 25, so that the low speed position of the switch 23 connects this winding across the lines. The coils of this low speed starting winding are of course properly coordinated and positioned with relation to the coil groupings of the main winding 7.

Attention is particularly directed to the fact that there are only four leads coming from the motor. Hence, installing the motor is a simple matter even though three different operating speeds are involved.

It will also be clear that the circuits shown and described herein can be employed for capacitor-start-induction-run motors by merely inserting condensers in suitable starting windings.

From the foregoing description taken in connection with the accompanying drawing, it will be readily apparent that this invention provides an electric motor having three definite speeds, and that by eliminating the necessity for the use of slip to obtain a third speed, a substantial improvement is effected over single phase motors heretofore in use.

What I claim as my invention is:

1. In an electric motor of the character described: a stator having two main windings each comprising a plurality of coils, the coils of one winding being grouped to produce one number of poles for one speed of the motor, the coils of the other winding being grouped to selectively produce a lesser or a greater number of poles than produced by the first mentioned main winding for greater and lesser motor speeds respectively, alternate groups of said second-designated winding being connected in series; one external lead connected to one end of the first-designated main winding and to one end of one series of alternate groups of the second-designated main winding; a second external lead connected to one end of the other series of alternate groups of said second-designated main winding; a third external lead connected to the opposite ends of both series of alternate groups of coils; a fourth external lead connected to the opposite end of the first designated main winding; and a three-position two-pole selector switch connected with a source of E. M. F. and said four external leads for selectively connecting the first-designated main winding with the source of E. M. F. in one position of the switch, and for connecting the second-designated main winding with the source of E. M. F. with the groups of coils connected to have current traverse adjacent groups in opposite directions in a second position of the switch to produce said lesser number of poles, and to have current traverse adjacent groups of coils in the same direction in the third position of the switch to produce said greater number of poles.

2. In an electric motor of the character described: a stator having two main windings each comprising a plurality of coils, the coils of one winding being grouped to produce one number of poles for one speed of the motor, the coils of the other winding being grouped to selectively produce a lesser or a greater number of poles than produced by the first mentioned main winding for greater and lesser motor speeds respectively, alternate groups of said second-designated winding being connected in series; one external lead connected to one end of the first-designated main winding and to one end of one series of alternate groups of the second-designated main winding; a second external lead connected to one end of the other series of alternate groups of said second-designated main winding; a third external lead connected to the opposite ends of both series of alternate groups of coils; a fourth external lead connected to the opposite end of the first-designated main winding; a three-position two-pole selector switch connected with a source of E. M. F. and said four external leads for selectively connecting the first-designated main winding with the source of E. M. F. in one position of the switch, and for connecting the second-designated main winding with the source of E. M. F. with the groups of coils connected to have current traverse adjacent groups in opposite directions in a second position of the switch to produce said lesser number of poles, and to have current traverse adjacent groups of coils in the same direction in the third position of the switch to produce said greater number of poles; a separate starting winding for each motor speed; and means for connecting one starting winding with the source of E. M. F. in each position of the switch.

3. In an electric motor of the character described: a stator having two main windings each comprising a plurality of coils, the coils of one winding being grouped to produce one number of poles for one speed of the motor, the coils of the other winding being grouped to selectively produce a lesser or a greater number of poles than produced by the first mentioned main winding for greater and lesser motor speeds respectively, alternate groups of said second-designated winding being connected in series; one external lead connected to one end of the first-designated main winding and to one end of one series of alternate groups of the second-designated main winding; a second external lead connected to one end of the other series of alternate groups of said second-designated main winding; a third external lead connected to the opposite ends of both series of alternate groups of coils; a fourth external lead connected to the opposite end of the first-designated main winding; a three-position two-pole selector switch connected with a source of E. M. F. and said four external leads for selectively connecting the first-designated main winding with the source of E. M. F. in one position of the switch, and for connecting the second-designated main winding with the source of E. M. F. with the groups of coils connected to have current traverse adjacent groups in opposite directions in a second position of the switch to produce said lesser number of poles, and to have current traverse adjacent groups of coils in the same direction in the third position of the switch to produce said greater number of poles; a separate starting winding for each motor speed; means for connecting one starting winding with the source of E. M. F. in each position of the switch; and a single centrifugal switch controlling connection of all the starting windings with the source of E. M. F.

4. In an electric motor of the character described: a stator having two main windings, each of the main windings comprising a plurality of coils arranged in groups, the grouping of the coils of one of said main windings being such as to produce one number of poles when connected with a source of E. M. F. for one speed of the motor, alternate groups of the other of said main windings being connected in series; one external lead connected to one end of the first-designated main winding and to one end of one series of alternate groups of the second-designated main winding; a second external lead connected to one end of the other series of alternate groups of said second-designated main winding; a third external lead connected to the opposite ends of both series of alternate groups of coils; a fourth external lead connected to the opposite end of the first-designated main winding; and a three-position two-pole selector switch connected with a source of E. M. F. and said four external leads for selectively connecting the first-designated main winding with the source of E. M. F. in one position of the switch, and for selectively connecting the second-designated main winding with the source of E. M. F. in such a manner that current traverses the adjacent groups of coils in opposite directions in a second position of the switch and the series of alternate groups of coils are connected in parallel to produce a number of poles less than the number formed by said first-designated main winding for high-speed operation of the motor, or so as to have current traverse adjacent groups of coils in the same direction in the third position of the switch and the series of alternate groups of coils are connected in series to produce a number of poles greater than the number formed in said first-designated main winding for low speed operation of the motor.

5. In an electric motor of the character described: a stator having two main windings, each of the main windings comprising a plurality of coils arranged in groups, the grouping of the coils of one of said main windings being such as to produce one number of poles when connected with a source of E. M. F. for one speed of the motor, alternate groups of the other of said main windings being connected in series; one external lead connected to one end of the first-designated main winding and to one end of one series of alternate groups of the second-designated main winding; a second external lead connected to one end of the other series of alternate groups of said second-designated main winding; a third external lead connected to the opposite ends of both series of alternate groups of coils; a fourth external lead connected to the opposite end of the first-designated main winding; a three-position two-pole selector switch connected with a source of E. M. F. and said four external leads for selectively connecting the first-designated main winding with the source of E. M. F. in one position of the switch, and for selectively connecting the second-designated main winding with the source of E. M. F. in such a manner that current traverses the adjacent groups of coils in opposite directions in a second position of the switch and the series of alternate groups of coils are connected in parallel to produce a number of poles less than the number formed by said first-designated main winding for high-speed operation of the motor, or so as to have current traverse adjacent groups of coils in the same direction in the third position of the switch and the series of alternate groups of coils are connected in series to produce a number of poles greater than the number formed in said first-designated main winding for low speed operation of the motor; a separate starting winding for each motor speed; and means for connecting one starting winding with the source of E. M. F. simultaneously with actuation of the speed selector switch to operate the motor at any one of its three speeds.

6. In an electric motor of the character described: a stator having two main windings, each of the main windings comprising a plurality of coils arranged in groups, the grouping of the coils of one of said main windings being such as to produce one number of poles when connected with a source of E. M. F. for one speed of the motor, alternate groups of the other of said main windings being connected in series; one external lead connected to one end of the first-designated main winding and to one end of one series of alternate groups of the second-designated main winding; a second external lead connected to one end of the other series of alternate groups of said second-designated main winding; a third external lead connected to the opposite ends of both series of alternate groups of coils; a fourth external lead connected to the opposite end of the first-designated main winding; a three-position two-pole selector switch connected with a source of E. M. F. and said four external leads for selectively connecting the first-designated main winding with the source of E. M. F. in one position of the switch, and for selectively connecting the second-designated main winding with the source of E. M. F. in such a manner that current traverses the adjacent groups of coils in opposite directions in a second position of the switch and the series of alternate groups of coils are connected in parallel to produce a number of poles less than the number formed by said first-designated main winding for high-speed operation of the motor, or so as to have current traverse adjacent groups of coils in the same direction in the third position of the switch and the series of alternate groups of coils are connected in series to produce a number of poles greater than the number formed in said first-designated main winding for low speed operation of the motor; a separate starting winding for each motor speed; means for connecting one starting winding with the source of E. M. F. simultaneously with actuation of the speed selector switch to operate the motor at any one of its three speeds; and a single centrifugal switch controlling connection of all the starting windings with the source of E. M. F.

WILBUR R. APPLEMAN.